United States Patent [19]

Minjolle et al.

[11] Patent Number: 4,696,710

[45] Date of Patent: Sep. 29, 1987

[54] METHOD OF MANUFACTURING A COMPOSITE REINFORCED STRUCTURE OF CERAMICS MATERIAL

[75] Inventors: Louis Minjolle, Tarbes; Claudette Drouet, Juillan; Alain Hordonneau, Saint Aubin de Medoc; Bernard Capdepuy, Saint Medard en Jalles, all of France

[73] Assignee: Ceramique et Composites, Courbevoie, France

[21] Appl. No.: 933,275

[22] Filed: Nov. 20, 1986

Related U.S. Application Data

[63] Continuation of Ser. No. 829,863, Feb. 18, 1986, abandoned, which is a continuation of Ser. No. 614,076, May 25, 1984, abandoned.

[30] Foreign Application Priority Data

May 25, 1983 [FR] France .............................. 83 08573

[51] Int. Cl.$^4$ .......................... B32B 18/00; B32B 31/26
[52] U.S. Cl. ...................................... 156/89; 156/184; 156/191; 264/60; 264/63
[58] Field of Search ...................... 156/62.2, 62.8, 89, 156/184, 191; 264/60, 63

[56] References Cited

U.S. PATENT DOCUMENTS

| | | | |
|---|---|---|---|
| 3,899,554 | 8/1975 | Kaiser et al. | 264/60 |
| 4,017,347 | 4/1977 | Cleveland | 156/89 |
| 4,207,371 | 6/1980 | Otto | 264/60 |
| 4,366,202 | 12/1982 | Borovsky | 428/283 |

FOREIGN PATENT DOCUMENTS 0032097 7/1981 European Pat. Off. .
1335842 10/1973 United Kingdom .

Primary Examiner—Caleb Weston
Attorney, Agent, or Firm—Finnegan, Henderson, Farabow, Garrett & Dunner

[57] ABSTRACT

A method of manufacturing a composite structure of ceramic material which is reinforced by refractory fibers, wherein a slip (11) is prepared from a synthetic resin having good wetting properties on ceramic material and fibers, embedding fibers (15) in the slip, eliminating the liquid phase from the slip by drying (16), eliminating the synthetic resin from the formed structure by heating, and sintering the fiber-impregnated ceramic material, wherein a synthetic resin solvent is incorporated in the slip, and wherein the fibers are inserted in the slip in the form of an assembly which is a sheet or roving, before the drying.

9 Claims, 1 Drawing Figure

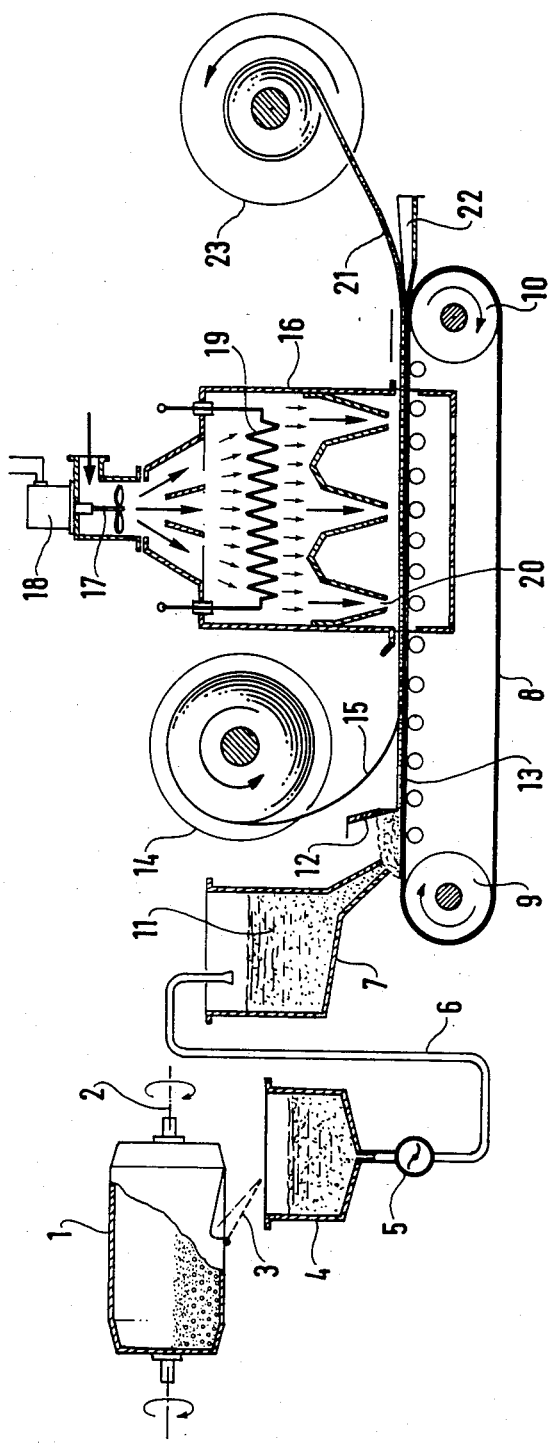

METHOD OF MANUFACTURING A COMPOSITE REINFORCED STRUCTURE OF CERAMICS MATERIAL

This application is a continuation of application Ser. No. 829,863, filed 2/18/86, now abandoned, which is a continuation of application Ser. No. 614,076, filed 5/25/84, and now abandoned.

The present invention relates to a method of manufacturing a composite structure of ceramics material which is reinforced by refractory fibers.

BACKGROUND OF THE INVENTION

British Pat. No. 1 335 842 in the name of Joseph Lucas (Industries) Limited describes a method of manufacturing sheets of fiber-reinforced silicon nitride. In that method, silicon in powder form is mixed in a dispersion of acrylic latex, and silicon nitride or alumino-silicate fibers are added to the mixture. The mixture is dried and formed into a powder which is then pressed into a strip and then heated and sintered under a nitrogen-containing atmosphere.

Such a method wets the fibers poorly, which results in reduced cohesion in the final structure. The resulting structures are difficult to stick to one another, and they require large quantities of water to be vaporized. The method is relatively lengthy and costly in energy.

Preferred implementations of the present invention provide a method of manufacturing a composite fiber-reinforced ceramics structure having a high degree of cohesion, which method is simple fast and cheap in energy terms, and furthermore is suitable for obtaining composite parts of complex shape without subjecting the fibers to large mechanical forces during the initial forming of the complex shape.

SUMMARY OF THE INVENTION

The present invention provides a method of manufacturing a composite structure of ceramic material which is reinforced by refractory fibers, wherein a slip is prepared from a synthetic resin having good wetting properties on ceramic material and fibers, embedding fibers in the slip, eliminating the liquid phase from the slip by drying, eliminating the synthetic resin from the formed structure by heating, and sintering the fiber-impregnated ceramic material, wherein a synthetic resin solvent is incorporated in the slip, and wherein the fibers are inserted in the slip in the form of an assembly which is a sheet or roving, before the drying.

The invention preferably includes at least one of the following features.

A plasticizer for the synthetic resin is also incorporated in the slip.

For preparing a composite sheet, the slip is spread over an endless belt, and the fibers are inserted into the slip as spread on the belt and before drying.

Relatively short fibers are projected into the slip on its arrival at the endless belt.

Long fibers are unwound and immersed side-by-side in the slip on its arrival at the endless belt.

A woven or non-woven cloth of refractory fibers is unwound and immersed in the slip.

After drying, the resulting sheet is stacked with other identical sheets and the stack is solidified by moderate heating, preferably at less than 200° C., prior to sintering.

After drying, the synthetic resin is partially eliminated from the formed sheet by heat treatment, the sheet is impregnated with a solvent or with a plasticizer and then stacked with other identical sheets that have been identically treated, and the sheets are then solidified together by moderate heating (less than 200° C.) prior to sintering.

After drying, the synthetic resin is completely or partially eliminated from the formed sheet by heat treatment, the sheet is impregnated with a liquid compound of the ceramic material and then stacked with other analogous sheets that have been identically treated, and then the sheets are solidified together by heating prior to sintering.

For preparing a composite cable, roving of refractory fibers is soaked in a refractory slip, and the slip-impregnated roving is passed through a calibrating nozzle prior to drying.

For manufacturing a shaped part, the dried cable is wound into a part of predetermined shape, and the turns of the part are heat glued to one another prior to the binder being eliminated by heating and then sintering.

To enable the above-defined method to provide parts having good mechanical properties, the transformations of the matrix structure during the heat treatment step(s) should not cause significant shrinking on sintering since that could damage the fibers and thus reduce the mechanical properties of the composite structure. The heat treatment step(s) should also be performed at temperatures which are below the temperature at which the fibers begin to be degraded.

Given these conditions, the method of the invention can be applied to many matrix materials, and in particular to:

silicon nitride obtained by nitriding parts of shaped silicon;

silicon nitride obtained from silicon nitride powder which is consolidated and densified by means of organic silicon compounds;

silicon carbide which has been densified by means of organic silicon compounds;

alumina;

alumina-magnesia spinel;

zirconia;

magnesia; and mullite.

BRIEF DESCRIPTION OF THE DRAWING

Examples of the invention are described with reference to the accompanying drawing in which the sole FIGURE is a diagram in section through apparatus for making composite sheet in accordance with the invention.

EXAMPLE 1

Parts made of alumina with silicon carbide fibers.
A slip is prepared of the following materials:

| | |
|---|---:|
| Alumina sold by Alcoa (grade A16) | 25 Kg |
| Polyvinyl butyral resin sold by Shawinigan Chemicals under the trade mark Butvar B 72A | 0.875 Kg |
| Trichloroethylene | 12.5 Kg |
| Dibutylphthalate | 4 Kg |

The slip is inserted in a 50 liter ball mill 1 together with 55 Kg of alumina balls. The mill 1 rotates about a horizontal axis 2. After milling for 24 hours, the milled slip is poured through a door 3 into a receptacle 4 from which it is pumped by a pump 5 along a conduit 6 to a supply tank 7 for application to an endless belt 8 made of polyvinyl-glycol terephthalate and driven over rolls 9 and 10.

The slip 11 is poured onto the upstream end of the moving belt. A scraper 12 adjusts the thickness of the layer 13 of slip on the belt.

At the same time, a plurality of reels 14 of silicon carbide thread (sold by Mitsui under the trade mark Nicalon) are unwound above the slip. The threads 15 sink into the slip.

The thread-impregnated slip is then taken by the belt 8 through a drier 16. The drier has a fan 17 driven by a motor 18 to blow dry air over a heating resistance 19. The hot dry air, eg. at 200° C., then passes through openings 20 to come into contact with the slip and evaporates the trichloroethylene. On leaving the drier, the resulting sheet 21 is separated from the surface of the belt by a knife 22 and is wound onto a drum 23.

The sheets obtained in this way are cut into strips of desired length, and are then stacked and heated to 135° C. to 150° C. The sheets are thus caused to stick together and form a solid block. The mechanial properties of the parts obtained are improved by crossing the directions of the fibers in the superposed sheets. The alumina can then be inserted, eg. by heating to a temperature in the range 1200° C. to 1800° C. for a period of 15 min to 1 hour.

EXAMPLE 2

Parts made of silicon nitride with silicon carbide fibers.

A slip is prepared of the following materials:

| Silicon powder (manufactured by Baudier) | 17.2 Kg |
|---|---|
| Polystyrene | 1.7 Kg |
| Paraffin | 0.4 Kg |
| Dioctylphthalate | 0.7 Kg |
| Cyclohexane | 18.8 Liters |

The slip is inserted in a 50 liter porcelain ball mill together with 40 Kg of porcelain balls. After milling for 24 hours, the slip is applied to the endless belt of polyethyleneglycol terephthalate as before. Nicalon silicon carbide threads are sunk into the slip after the slip has been spread out on the belt.

After the slip has been dried, and parts have been made by stacking and gluing strips cut out from the sheet which is delivered at the output of the endless belt, the silicon is nitrided at 1150° C. to 1250° C. under a nitrogen atmosphere. The silicon nitride is sintered at the same time without shrinkage, since the increase in weight due to the nitriding compensates the shrinkage due to sintering.

EXAMPLE 3

Parts made of alumina with alumina fibers.
A slip is prepared of the following materials:

| Alcoa (grade A16) alumina | 17.6 Kg |
|---|---|
| Polystyrene | 1.45 Kg |
| Paraffin | 0.35 Kg |
| Dioctylphthalate | 0.6 Kg |
| Cyclohexane | 16.5 Liters |

The slip is inserted in a 50 liter alumina ball mill together with 55 Kg of alumina balls, and is milled for 24 hours.

The procedure is as before, with grade FP alumina fibers sold by Dupont de Nemours being embedded in the slip after the slip has been spread on the endless belt. The fibers are aligned with the direction of belt motion. After drying and cutting up into strips, and after the strips have been stacked and glued, the alumina in the resulting parts is sintered at between 1200° C. and 1800° C. for a period of 15 minutes to 1 hour.

The above method enables the quality of the gluing between the various strips to be checked before applying heat to obtain ceramic consolidation (eg. by ultrasonic or holographic examination). Any areas which show up as faulty may be repaired by reapplying resin plasticiser and reapplying heat treatment at a relatively low temperature.

Although the method as described above with reference to the examples appears to be the best manner of performing the invention, it will readily be understood that various modifications can be made without going beyond the scope of the invention. In particular, the slip could be milled dry rather than wet as described. Instead of embedding threads of refractory fibers in the slip, a woven cloth of such threads may be embedded therein, or alternatively, short elementary fibers may be embedded therein in random directions. The layer of slip may be dried in some other manner, eg. by infrared radiation.

Composite cables and parts built up from composite cables can be made in analogous manner. Composite cables can also be used as component parts for building up a three dimensional structure, by making holes in raw composite sheets as described above, by stacking the sheets, and then inserting the cables in the channels formed by superposing the holes. The assembled sheets and cables can be made solid by heating to 135° C.-150° C. and then sintering the final part.

We claim:
1. A method of forming a composite structure comprised of ceramic material reinforced with refractory fibers, said method comprising the steps of:
   providing a slip comprised of a ceramic powder, a synthetic resin capable of wetting said ceramic powder and said refractory fibers, and a solvent for said synthetic resin;
   spreading said slip on moving belt means;
   introducing refractory fibers into said slip;
   drying said slip to eliminate the liquid phase and form a sheet;
   stacking a plurality of said sheets;
   heating the resultant stack to join said plurality of sheets to form said composite structure; and
   sintering said ceramic material in said composite structure without degrading said refractory fibers.
2. The method of claim 1, wherein said stack is heated at a temperature less than 200° C.
3. The method of claim 1, wherein said refractory fibers in said slip are aligned in the direction of motion of said belt means.
4. The method of claim 3, wherein said step of stacking said plurality of sheets includes the step of:
   aligning said sheets so that the direction of said refractory fibers in each sheet is crossed with respect to adjacent sheets in said stack.
5. The method of claim 1, wherein said slip is further comprised of a plasticizer for said synthetic resin.

6. The method of claim 1, wherein said step of introducing refractory fibers into said slip includes the steps of:
projecting relatively short fibers into said slip; and
immersing relatively long fibers in said slip in a side-by-side relationship.

7. The method of claim 1, wherein said step of introducing refractory fibers into said slip includes the step of:
immersing a woven or non-woven cloth of refractory fibers in said slip.

8. The method of claim 1, including, after said step of drying said slip, the step of:
cutting said sheet into a plurality of sheets of a desired length.

9. A method of forming a composite cable structure comprised of ceramic material reinforced with refractory fibers, said method comprising the steps of:
providing a slip comprised of a ceramic powder, a synthetic resin capable of wetting said ceramic powder and said refractory fibers, and a solvent for said synthetic resin;
soaking a wick of refractory fibers in said slip to impregnate said fibers with said slip;
passing said impregnated wick slip through a calibrating nozzle;
drying said impregnated wick slip to eliminate the liquid phase and form a cable;
winding said cable into a desired shape;
heating said wound cable to join the turns of the cable to form a composite cable structure; and
sintering said ceramic material in said composite cable structure without degrading said refractory fibers.

* * * * *